SECONDARY CLOCK SYNCHRONIZING MECHANISM

Filed Sept. 29, 1959 5 Sheets-Sheet 1

INVENTOR.
Vernon T. Kleimeyer
BY
Wood, Herron & Evans
ATTORNEYS.

SECONDARY CLOCK SYNCHRONIZING MECHANISM

Filed Sept. 29, 1959

INVENTOR.
Vernon F. Kleimeyer
BY
Wood, Herron & Evans
ATTORNEYS.

April 10, 1962 V. T. KLEIMEYER 3,028,722

SECONDARY CLOCK SYNCHRONIZING MECHANISM

Filed Sept. 29, 1959 5 Sheets-Sheet 3

INVENTOR.

Vernon T. Kleimeyer

BY

Wood, Herron & Evans

ATTORNEYS.

INVENTOR.
Vernon T. Kleimeyer
BY
Wood, Herron & Evans
ATTORNEYS.

April 10, 1962 V. T. KLEIMEYER 3,028,722

SECONDARY CLOCK SYNCHRONIZING MECHANISM

Filed Sept. 29, 1959 5 Sheets-Sheet 5

INVENTOR.

Vernon T. Kleimeyer

BY

Wood, Herron & Evans

ATTORNEYS.

United States Patent Office 3,028,722
Patented Apr. 10, 1962

3,028,722

SECONDARY CLOCK SYNCHRONIZING MECHANISM

Vernon T. Kleimeyer, Cincinnati, Ohio, assignor to The Cincinnati Time Recorder Company, Cincinnati, Ohio, a corporation of Ohio Filed Sept. 29, 1959, Ser. No. 843,303
13 Claims. (Cl. 58—35)

The present invention relates to time keeping apparatus and is particularly directed to self-correcting synchronous clocks and similar time keeping devices of the type normally driven by individual driving motors such as synchronous alternating current motors, and adapted to be regulated in response to a signal transmitted from a source of correct or standard time. This application is a continuation in part of Vernon T. Kleimeyer United States Patent Application for "Secondary Clock Synchronizing Mechanism," Serial No. 566,147, filed February 17, 1956 and now abandoned.

The present clock mechanism is particularly suitable for use as a secondary clock operated in conjunction with a master clock. In a typical installation several secondary clocks disposed at various locations in a building, are placed in parallel electrical connection with one another and in electrical connection with the master clock. The master clock keeps very accurate time and provides signals at predetermined times for actuating a correcting mechanism disposed within each secondary clock for bringing the time setting of that clock into synchronism with the master clock.

For example, in one embodiment the master clock transmits a pulse during the fifty-eighth minute of each hour for effecting the correction of the secondary clocks. In response to this pulse, the minute and second hands of each secondary clock are automatically brought to a chronological position coincident with the hands of the master clock and in synchronism with one another. Thus, not only does the minute hand of each secondary clock indicate the correct minute, but the second hand is synchronized with the minute hand so that when the latter points to an even minute on the clock dial the second hand is disposed in registry with 12 on the dial.

More particularly, a preferred form of secondary clock constructed in accordance with the present invention comprises a synchronous alternating current motor and a gear drive for continuously driving an hour hand, minute hand, and a second hand at their respective time indicating rates. In addition the clock includes means for correcting the minute hand and second hand at predetermined intervals in response to signals from a master clock or other source of standard time. These pulses are transmitted to the secondary clock from approximately the beginning of the fifty-eighth minute of each standard time hour until precisely the fifty-ninth minute of the hour.

The correcting means disposed within the secondary clock are energized by the signal from the master clock to initiate a correction cycle during which the minute hand, if it is slow at the fifty-eighth minute of the hour, is brought up to the correct time during the fifty-eighth minute of the hour, and the second hand is brought into synchronism with the minute hand. Consequently, when the fifty-eighth minute is completed and the fifty-ninth minute commences the minute and second hands of the clock are accurately synchronized with the standard time source.

As explained in detail below, the secondary clock mechanism includes a seconds shaft, a minutes sleeve, and an hours sleeve which respectively carry the second hand, minute hand, and hour hand. The sleeves and shaft are driven from an alternating current synchronous motor at their normal rates through a gear drive of generally conventional construction. A solenoid, adapted for energization in response to the synchronizing signals from the master clock is also mounted within the secondary clock. This solenoid, when energized, actuates an overdriving gear train which is effective to drive the minute hand at a rapid rate. The solenoid also actuates abutment means for interrupting the rotation of the second shaft and minute sleeve when the hands carried by these members are respectively at the fifty-ninth minute and sixtieth second position. The motion of these members is stopped until the corrective cycle is completed at precisely the fifty-ninth minute when the second shaft and hand and the minute sleeve and hand are released so that they may resume position at their normal rate in coincidence with the hands of the master clock.

In the present secondary clock the overdriving gear train includes a driving member rotated at a high rate of speed from the motor and adapted for axial movement into an operative position in response to energization of the solenoid. The driving member cooperates with a driven gear connected to the minute hand and carrying a lug positioned in correspondence with the position of the minute hand. If this hand is slow when the driving member is shitfed into its operative position, a finger on the driving member engages the lug on the driven gear and rapidly rotates that gear to advance the minute hand at a relatively high rate of speed. This high speed advancement continues until the driven gear is stopped by the abutment member shifted into position by the solenoid. Precisely at the fifty-ninth minute the driving member and abutment member are withdrawn from engagement with the driven gear so that the minute hand is again driven through its normal gear train. Simultaneously, an abutment member which had been interposed in the path of a member rotated in synchronism with the second hand is withdrawn from engagement with that member so that the second hand is also driven at its normal rate of speed in synchronized position with the minute hand.

One of the principal advantages of the present clock construction is that it is extremely simple and can be operated for protracted periods with a minimum amount of maintenance and repair.

A further advantage of the present mechanism is that it is extremely quiet in operation and even during the corrective cycle the mechanism does not produce loud clicks or other noises which tend to distract the occupants of a room.

In addition to the means for correcting the minute and second hands described above, the present secondary clock system also includes means for correcting the position of the hour hand. As will be explained below the minute hand correcting mechanism will automatically correct the position of each of the hands for a loss of time up to fifty-nine minutes and will correct for a gain of time of approximately fifty-nine seconds. This range of correction is normally sufficient since the frequency of commercial alternating current is closely regulated at the source and synchronous motor-driven clocks seldom vary more than a small fraction of a minute. However, there are occasional times when the power supply is interrupted for a substantial period so that a secondary clock will be several hours slow. The present secondary clock system also provides means for automatically correcting any error, no matter how large in the position of the hour hand. These hour hand correcting means function at predetermined intervals, less frequent than the minute hand correcting periods, for example every twelve hours.

The hour hand correcting means include two series connected switches operated by the master clock and an hour hand correction switch associated with the secondary clock. One of the two switches in the master clock periodically conditions the solenoid circuit for completion through the second switch in the master clock and the hour hand correction switch in the secondary clock. To permit correction of any amount of error in the hour hand this conditioning switch is closed for at least twelve minutes and preferably for a slightly longer period; for example from 5:00 to 5:30. The second switch in the master clock is a cycling switch, the function of which is explained below. This switch is closed a sufficient time to allow the overdriving gear train to advance the secondary clock one hour and then is opened for a brief interval and again closed. The hourly correction switch is a normally closed switch but is arranged so that it is opened when the hour hand of the secondary clock is in the same chronological position as the period during which the master clock switch is closed; e.g. from 5:00 to 5:30 in the embodiment being described.

Thus, if the hour hand of the secondary clock is on time, the hour hand correction switch associated with that clock opens at the same time that the hour correction switch of the master clock closes to nullify the effect of that switch. If, however, the hour hand of the secondary clock is slow by more than an hour, the hour hand correction switch associated with that clock is closed. When the corresponding switch in the master clock is closed and a circuit is completed through the cycling switch to the solenoid to initiate a corrective cycle in the secondary clock in which the hour hand is advanced through one hour.

The cycling switch then opens momentarily and again closes to initiate a second corrective cycle to advance the hour hand another hour. The cycling switch continues to operate in this manner causing additional corrective cycles to be effected in the secondary clock until the hour hand of that clock is advanced to the correct hour at which time the hour hand correction switch in the secondary clock will open to prevent further corrective action. At the next hour the minute and second hand of the secondary clock are corrected in the normal manner to bring that clock into absolute synchronism with the master clock.

In addition to this automatic correction of the hour hand, means are provided for manually correcting the position of the hour hand in case it should be desired to correct the position of that hand as soon as it is noted that it is slow rather than to wait for the normal hour hand correction. This manual correction means includes a manually operated switch associated with the master clock and placed in parallel relationship with the conditioning switch in that clock. When the manual switch is closed it completes a circuit through the cycling switch to the secondary clock in the same manner as the conditioning switch of the master clock. Consequently, by manipulating the manual controlled switch the hour hand of the secondary clock can be corrected at any time during the day.

It will readily be appreciated that the present secondary clock mechanism is highly advantageous for use independently of a master clock. That is, in many installations clocks are mounted in show windows, in elevated positions on buildings, high on the walls of a room, and in numerous other relatively inaccessible positions. Often the number of clocks in any installation is not sufficient to warrant the installation of a master clock for automatically correcting the secondary clocks, nevertheless power failures and other causes do give rise to the need for occasionally correcting the hands of the secondary clocks. By utilizing the secondary clock mechanism of the present invention and a manually operable switch located at any convenient place remote from the clock, the hands of the secondary clock can readily be brought into agreement with the hands of any available accurate clock. This is accomplished by closing the manual switch to energize the secondary clock solenoid causing the clock hands to be advanced at a rapid rate through the overdriving gear train until the hands of the secondary clock agree with any accurate timepiece. If the secondary clock is more than an hour slow, it is necessary to alternately open and close the manual switch to cause a succession of corrective cycles. If desired this can automatically be accomplished by connecting a cycling switch in series with the manual switch.

It will readily be appreciated that the provision of remote controlled correcting means effective to bring the hands of the secondary clock to any desired time, e.g., 9:28, is highly advantageous. This control is possible only because in the present clock the overdrive gear train is at all times under the control of the electric solenoid and hence under the control of the manual electric switch.

The present secondary clocks are also highly advantageous in that they employ a minimum number of parts for effecting the desired operation. Consequently, the present secondary clocks can be more economically produced than those secondary clocks of the prior art which require a larger number of accurately dimensioned components.

These and other objects and advantages of the present invention will be more readily apparent from a further consideration of the following detailed description of the drawings illustrating a preferred embodiment of the invention.

Figure 2:
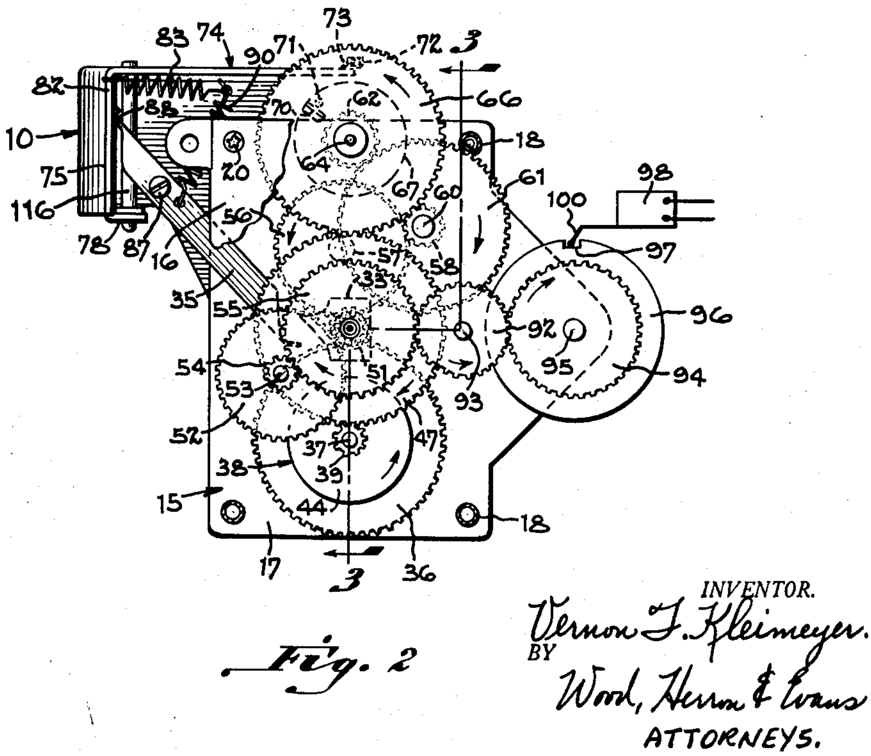
FIGURE 2 is a front elevational view of a secondary clock constructed in accordance with the principles of the present invention, the dial face, clock hands, and clock casing having been removed to more clearly reveal the clock mechanism.
Figure 3:
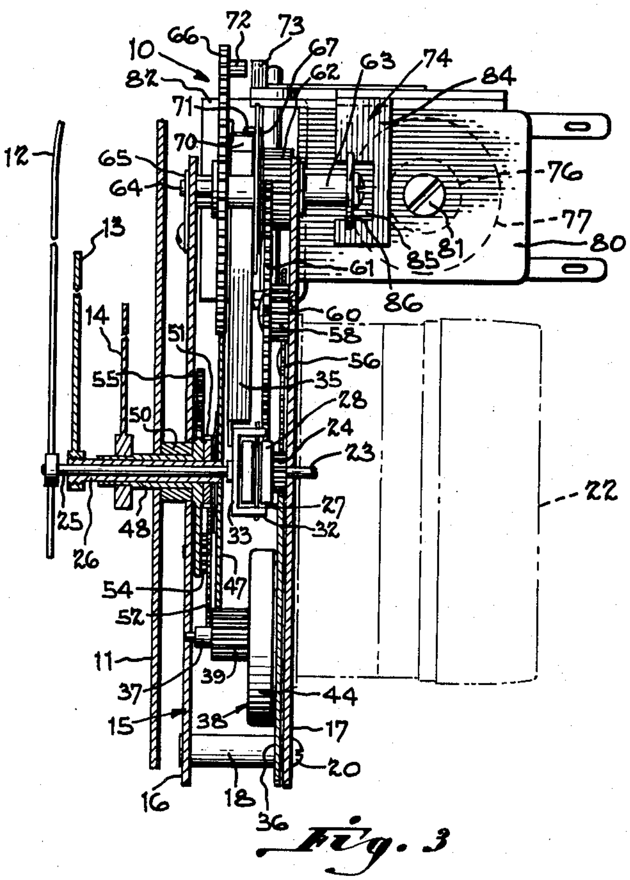
FIGURE 3 is a cross sectional view taken along line 3—3 of FIGURE 2.

As shown in FIGURES 2 and 3, a preferred form of secondary clock 10 constructed in accordance with the principles of the present invention comprises a conventional dial face 11 provided with suitable time indicating numerals, a second hand 12, minute hand 13, and hour hand 14. These elements are mounted upon a casing 15 comprising spaced, parallel front and rear support plates 16 and 17 joined together by means of pillars 18 and bolts 20. An electric driving motor 22 is secured in any suitable manner to rear support plate 17. Motor 22 is preferably of the self-starting synchronous type and is adapted to be driven at a predetermined rate from a conventional alternating current power line.

Figure 11:
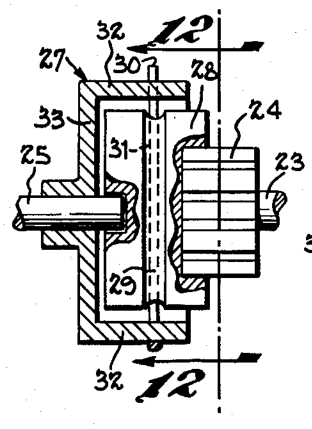
FIGURES 11 is an enlarged elevational view of the second hand friction drive.
Figure 12:
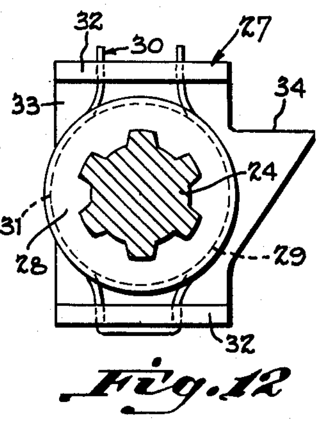
FIGURE 12 is a view taken along line 12—12 of FIGURE 11.

The output shaft 23 of motor 22 supports a motor pinion 24 which is splined or otherwise rigidly secured to the shaft. This pinion is effective to drive second hand shaft 25, which carries second hand 12 and is rotatably journalled in minute sleeve 26, through a friction drive and stop assembly 27. This assembly, as best shown in FIGURES 11 and 12, includes an internally threaded cup shaped gear 28 rotatably engaging second shaft 25. Gear 28 is configurated to form a circumferential groove 29 adapted to receive a generally U-shaped spring friction member 30. Friction member 30 embraces gear 28 so that the slightly bowed arms 31 of the friction member engage opposite sides of groove 29 and are urged into frictional driving engagement with the groove. Spring member 30 is supported between arms 32 formed on stop member 33, the stop member in turn being rigidly secured to minute shaft 25. Stop member 33 also is provided with a radially extending finger 34 disposed for cooperative engagement with pivoted stop arm 35, as explained below.

When motor 22 is energized, it drives shaft 23 at the rate of one revolution per minute. Motor pinion 24 and gear 28 are driven at the same rate of speed; this gear in turn, drives the second shaft 25 at one revolution per minute through friction member 30, and stop member 33, mounted on the seconds shaft. However, as explained in detail below, during corrective operations, friction drive 27 permits relative movement between gear 28 and friction member 30 so that the second hand can be corrected without the necessity of stopping the motor.

Figure 10:
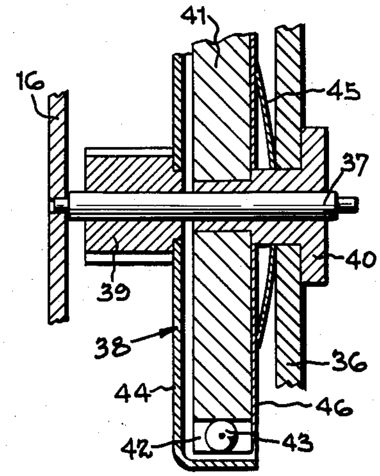
FIGURE 10 is an enlarged partial cross sectional view showing details of the ball and friction clutches.

The drive for minute sleeve 26, which carries minute hand 13, is also taken from motor pinion 24 through gear 36, which is mounted upon shaft 37, the shaft in turn, supporting a ball clutch 38 and pinion 39. As shown in FIGURE 10, ball clutch 38 is preferably in the form of a conventional over-riding ball clutch including a hub 40 rotatably mounted upon shaft 37 and rotatably journalling gear 36. Hub 40 carries a disc 41 permanently secured to the hub and configurated to form a plurality of spiral peripheral grooves 42. Each of these grooves houses a ball 43 which is adapted to be forced outwardly when disc 41 is rotated in a counter-clockwise direction as shown in FIGURE 2 to provide a frictional engagement between the disc and cup 44, the cup in turn being rigidly secured to pinion 39 fastened to shaft 37.

A bowed spring 45 having a central portion bearing against gear 36 and radially extending arms bearing against rotary member 46 is effective to drive disc 41 from gear 36. Pinion 39 meshes with a minute gear 47 which is rigidly secured to the inner end of minute sleeve 26. Minute sleeve 26 is journalled within hour sleeve 48, the hour sleeve in turn being rotatably mounted in a bushing 50 fitted in an opening in front plate 16 of the casing 15.

Hour sleeve 48 is driven at the proper rate of one revolution in every 12 hours by a gear drive which comprises pinion 51 rigidly mounted upon minute sleeve 26 and in meshing engagement with gear 52 which is mounted on shaft 53 journalled in frame member 15. Shaft 53 carries pinion 54 which meshes with hour gear 55, the hour gear being rigidly joined to hour sleeve 48.

The minute hand corrective means comprises a large gear 56 which meshes with motor pinion 24 and is rotatably mounted upon a pin 57 supported by rear plate 17. Gear 56 meshes with, and drives a pinion 58 journalled on pin 60 carried by rear plate 17. Pin 60 also carries a large gear 61 which is disposed for engagement with elongated pinion 62 mounted upon a slidable sleeve 63 surrounding upper shaft 64. Shaft 64 is journalled in sleeve 63 and in bearing plate 65 secured to the front wall 16 of the clock frame.

Driven gear 66, identical with minute gear 47, is rigidly secured to shaft 64 while sleeve 63 is adapted for both relative and sliding movement relative to the shaft. Pinion 62 and a driving member such as disc 67 are secured to the sleeve, the disc 67 being driven from the pinion by means of a bowed friction spring 68 which is compressed between the gear and driving member. Pinion 62 is driven through the gear train just described so that disc 67 is rotated at a rate of speed slightly in excess of two revolutions per minute.

The driven gear 66 turns with the minute gear at a normal rate of one revolution per hour. This gear is provided with an inwardly facing lug 70 adapted for engagement with an outwardly extending lug 71 formed on driving disc 67. Driven gear 66 also carries an inwardly extending knife-edged stop finger 72 adapted for engagement with abutment arm 73 carried by solenoid armature 74.

Figure 4:
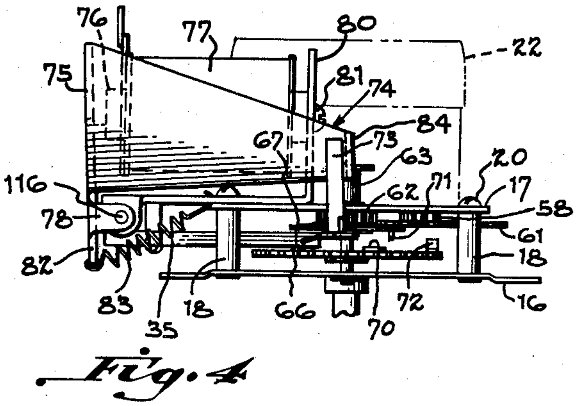
FIGURE 4 is a partial top view of the correcting mechanism with the solenoid deenergized.
Figure 5:
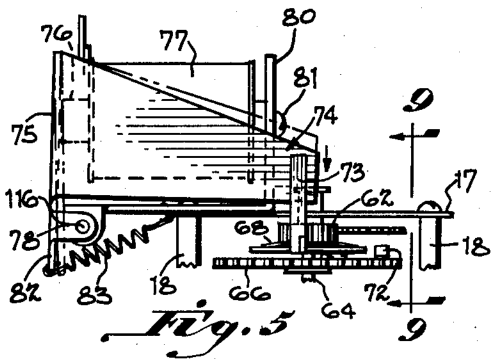
FIGURE 5 is a partial top view, similar to FIGURE 4, with the solenoid energized.
Figure 9:
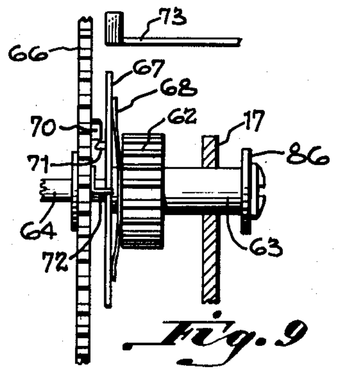
FIGURE 9 is a partial cross sectional view taken along line 9—9 of FIGURE 5.

This armature is in the form of a generally channel-shaped bracket member including an end wall 75 disposed in proximity to core 76 of electric solenoid coil 77. End wall 75 includes two flanges 78 by means of which the bracket is pivotally secured to mounting member 80, the mounting member in turn being bolted or riveted to rear plate member 17. Mounting member 80 also carries solenoid coil 77 and core 76 which are bolted to the mounting member as at 81. As best shown in FIGURE 4, end wall 75 also includes an extension 82, to which is secured one end of coil spring 83, the other end of the coil spring being in engagement with mounting member 80. The spring is effective to urge armature 74 rearwardly so that end wall 75 is normally in spaced relationship with solenoid core 76. Armature 74 also carries a depending arm 84 having a slot 85 embracing a washer 86 secured to slidable sleeve 63.

When the magnet is deenergized as shown in FIGURE 4, sleeve 63 is withdrawn rearwardly so that the cooperating lugs on the driving disc and driven gear are axially spaced from one another. Also, stop arm 73 is withdrawn from the path of movement of stop finger 72 on gear 66. However, as explained in greater detail below, when the solenoid is energized, armature 74 pivots forwardly to bring stop arm 73 into the path of knife-edged finger 72, and simultaneously sleeve 63 is forced inwardly to urge driving member 67 toward gear 66 so that the cooperating lugs 71 and 70 on these two members are disposed for cooperative engagement with one another.

When the solenoid is deenergized, the driving disc 67 is rotated through a gear train including gear 56, pinion 58, gear 61, pinion 62, and friction spring 68 at a rate in excess of two revolutions per minute. Meanwhile, driven gear 66 is turning in synchronism with the minute gear 47 at a rate of one revolution per minute. Since the driving disc is withdrawn rearwardly, the pin 71 on that disc and the lug 70 on the driven gear are maintained out of engagement with one another.

However, when the solenoid is energized, the core 76 of the solenoid attracts the end wall 75 of armature 74 rotating the armature inwardly. The free end of the armature which carries sleeve 63 forces that sleeve inwardly together with pinion 62 and driving disc 67. Movement of armature 74 also causes abutment arm 73 to move inwardly into the path of movement of stop finger 72 formed on the stationary gear. As explained in detail below, if the clock is slow, the lug 71 on driving disc 67 will overtake the lug on gear 66 and will then drive that gear and with it the minute gear and shaft, at a rate in excess of two revolutions per minute until stop finger 72 on gear 66 is brought into engagement with abutment arm 73. When the engagement of these latter two members occurs, gear 66 will stop rotating; although pinion 62 continues to rotate because of the slippage between that member and driving disc 67 at friction spring member 68. It will be appreciated that ball clutch 38 permits the minute shaft to be over-driven at a speed greater than the normal drive. Furthermore, after the minute gear has been stopped by the engagement of finger 72 on drive gear 66 with stop arm 73, the friction spring 45 permits the motor to continue to operate for rotating the second hand even though the minute hand has stopped.

The second hand correcting mechanism comprises a pivoted stop arm 35, mounted upon a pin 87 carried by mounting member 80. The arm includes a rearwardly extending segment 88 adapted for abutment with end wall 75 of the solenoid armature 74. A spring 90 is secured to the arm and to the mounting member for normally urging the lower end of the stop arm upwardly. The lower end of this arm includes an arcuate segment 91 adapted for engagement with stop finger 34 carried by the stop member 33.

Figures 6, 7, 8:
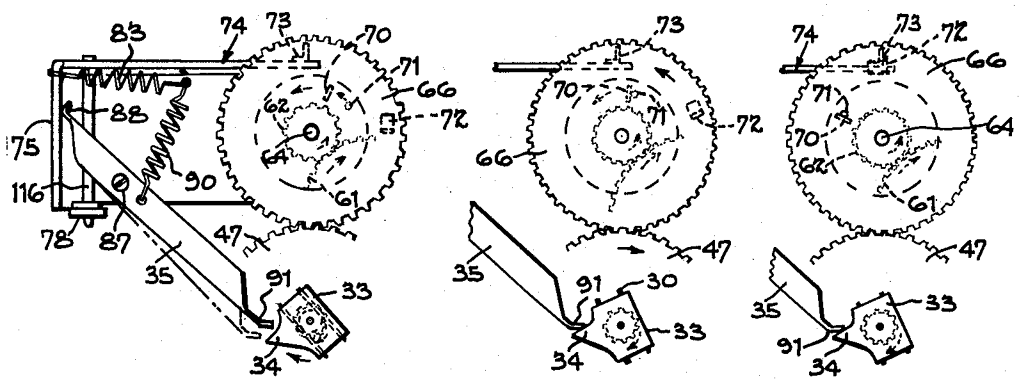
FIGURE 6 is a partial view showing the correcting mechanism at the start of a typical corrective cycle.
FIGURE 7 is a view similar to FIGURE 6 taken slightly later in the corrective cycle.
FIGURE 8 is a view similar to FIGURE 6 taken near the end of the corrective cycle.

When the solenoid is deenergized, arm 35 is maintained in the dotted position shown in FIGURE 6 in which it is out of the path of movement of stop member 33. However, when the solenoid is energized and armature 74 is shifted rearwardly, the portion of wall 75 in abutment with the stop arm moves to the left as viewed in FIGURE 6, permitting the stop arm to move in a counterclockwise direction under the force of spring 90 bringing the arm into the path of stop finger 34. When the second hand reaches a predetermined position, preferably the zero seconds mark, the stop finger 34 engages arm 35 which prevents further rotation of the stop member and seconds hand. However, the motor continues to run freely due to the slippage present between spring element 30 and internal gear 28.

Secondary clock 10 also includes hour hand positioning means including an idler pinion 92 rotatably mounted on pin 93 in engagement with hour gear 55. This pinion also engages a large gear 94 identical with hour gear 55 and adapted to rotate once every 12 hours. Gear 94 is journalled on shaft 95 carried between front and rear plates 16 and 17. A large switch actuating cam 96 is also mounted on shaft 95 for rotation with gear 94. In the embodiment shown, cam 96 is in the form of a disc provided with a notch 97 extending over approximately one twenty-fourth of the circumference of the disc.

A switch 98 is provided with a finger 100 disposed for engagement with the circumference of disc 96. Switch 98 is normally closed when the switch finger tracks on the circumference of the disc but is open when the finger strikes recess 97. As explained below in conjunction with the description of FIGURE 1, switch 98 is placed in series connection with solenoid coil 77, and is effective to control the operation of the solenoid to effect automatic correction of the hour hand every 12 hours.

Figure 1:
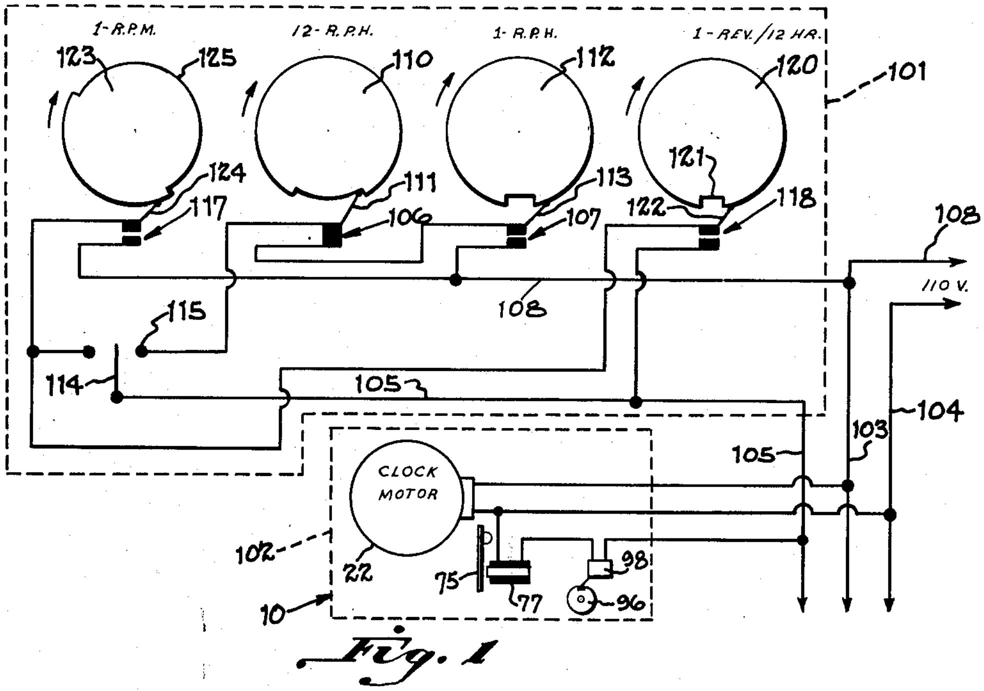
FIGURE 1 is a schematic circuit diagram of a master control circuit adapted for use in conjunction with the present secondary clock.

A secondary clock system incorporating the present secondary clock is shown in FIGURE 1. As there shown, a master clock is indicated by dotted lines 102. The motor 22 of secondary clock 10 is energized from power lines 103 and 104. Additional secondary clocks, each having a driving motor, can be connected in parallel electrical relationship with clock 10 if desired.

The principal function of master clock 101 is to send timed corrective pulses to secondary clock 10 through line 105. Master clock 101 includes some mechanism for keeping extremely accurate time. Suitable mechanisms for accomplishing this result are well known in the art and it is not considered necessary to include a detailed description of a typical mechanism here. The time keeping mechanism of the master clock is effective to control four switches, shown diagrammatically in FIGURE 1 as comprising rotating cams disposed for engagement with cooperating switch fingers adapted to actuate electrical contacts.

As shown diagrammatically, each of the switches is closed when its switch finger rides in the recessed portion of the associated cam and is open when the switch finger engages the raised portion of the cam. Two of the switches incorporated in the master clock cooperate to provide signals for automatically correcting the secondary clock every hour. These switches 106 and 107 are placed in series electrical connection with power line 108, normally closed switch 98 and solenoid 77. In the embodiment shown, switch 106 includes a cam 110 which turns at 12 revolutions per hour. This cam and its associated switch finger 111 are arranged so that the switch contacts are closed at five minute intervals including an interval extending from 58 minutes and 3 seconds to precisely 59 minutes and 0 second of each hour. Cam 112 of switch 107 and its associated switch finger 113 are arranged so that the switch contacts are closed from the 58th minute of each hour through the first minute of the succeeding hour, cam 112 being rotated at one revolution per hour.

Selector switch 114 provides means for selecting either manual or automatic correction of the secondary clocks. When switch 114 is in the "automatic" position, that is in engagement with contact 115, the circuit is complete through switches 106, 107, 114 and 98 to solenoid coil 77 from 58′ 03″ of each hour to 59′ 00″ of each hour. When this solenoid coil is energized, the sliding gear assembly and stop arm are shifted inwardly and cooperate to syncronize the minute hand while second stop arm 35 is forced inwardly to synchronize the second hand through engagement of the stop finger 34.

A typical time correcting operation can better be understood from a study of FIGURES 6, 7 and 8. Assume, by way of example, that the master clock is at 9:58′ 03″ and the secondary clock is at 9:25′ 10″. Switches 106, 107 and 114 are closed to energize the coil of solenoid 77. The solenoid attracts end wall 75 of armature 74 causing that bracket to pivot about pin 116. This forces sleeve 63 inwardly so that gear 66 and driving disc 67 are in driving engagement. Pinion 62, however, is maintained in engagement with gear 61 so that the pinion continues to operate and in turn rotates driving disc 67 through friction member 68. The relative positions of the driving wheel and stationary gear 66 in an early part of a corrective cycle are shown in FIGURE 6. Slightly later in the cycle, lug 71 on the driving disc overtakes lug 70 on gear 66 and starts to drive that gear at a rate of more than two revolutions per minute.

Since gear 66 is in direct engagement with minute gear 47, the minute gear, sleeve 26, and minute hand 13 are driven at a high, corrective rate of speed. This continues until the minute hand reaches precisely the 59th minute of the hour, at which time stop finger 72 on the gear 66 engages stop arm 73. Gear 66 is thereafter held stationary during the corrective cycle as is minute gear 47 and the minute hand. However, pinion 62 continues to rotate, slippage occurring between that member and the driving member through spring element 68.

Motor 22 also continues to rotate, driving second hand 12; this is facilitated by the slippage occurring in the minute drive between ball clutch 38 and gear 36 at friction member 45. The second hand continues to rotate until it reaches precisely the 00″ position, at which time, stop finger 34 is brought into engagement with arm 35 to hold the second hand shaft stationary, slippage occurring between the motor pinion and second hand shaft at friction member 45.

Both the second and minute hands are held in this position until the master clock reaches 9:59′ 00″. At that time, switch 106 opens deenergizing the coil of solenoid 77. When the solenoid is deenergized, armature 74 pivots outwardly under the influence of spring 83, withdrawing stop arm 73 from engagement with stop finger 72 on gear 66; and simultaneously disengaging arm 35 from stop finger 34. The minute hand and second hand, having been corrected in a single operation, are thereafter driven in synchronism with the master clock through their normal gear drives.

Should the secondary clock be running slightly ahead of the master clock; say at 9:58′ 35″ when the master clock is at 9:58′ 03″ the correction cycle will be initiated upon the closing of switch 106 at 9:58′ 03″ as explained below. This will cause solenoid 77 to be energized and stop arms 73 and 35 to be shifted into the path of the stop lug 72 carried by gear 66 and finger 34. As soon as the secondary clock reaches 9:59′ 00″ both the minute hand and second hand will be stopped as before; and will be held in this position until the solenoid is deenergized when the master clock reaches 9:59′ 00″. When the solenoid is deenergized, stop arms 73 and 35 are withdrawn and the minute and second hands are driven in synchronism with the master clock through their normal gear drives.

In the embodiment shown, the secondary clock will automatically correct for a loss of time up to 59 minutes and will correct for a gain of time up to 59 seconds. Since the frequency of commercially available alternating current is extremely closely regulated at the source, this range of correction is almost always sufficient, since synchronous motor clocks seldom vary more than a fraction of a minute, except in the case of interruption of power or where there is a substantial amount of friction present in the secondary clock. Furthermore, correction for loss of time of more than an hour can be effected as explained below, by manipulating the selector switch 114.

In addition, the secondary clock system includes means for automatically correcting the hour hand at predetermined intervals, for example, every 12 hours. In general, the hour hand correcting means includes a switch arrangement for bypassing the hourly correcting switches 106 and 107 and energizing the solenoid 77 for a sufficient period to bring the hour hand up to the correct time so that at the next hourly correction, the minute and second hands are corrected to bring the clock to the precise time.

More specifically, the hour hand correcting means includes two switches in the master clock. These switches are 117 and 118. Switches 117 and 118 are connected in series with one another between power line 108 and 12 hour correction switch 98 contained within the secondary clock. Switches 117 and 118 are also in parallel electrical connection with the hourly correction switches 106 and 107, and, in effect, function to provide an alternate electrical path to energize solenoid coil 77 at predetermined times, for example, every 12 hours.

In addition to these two switches in the master clock, the hour hand correction means also includes a switch 98 as described above, having a finger 100 adapted to engage the periphery of switch actuating disc 96. This switch is a normally closed switch but is open when the switch finger engages recess 97. In the embodiment shown, the switch finger and this recess are aligned so that the switch is open from 5:00 to 5:30 reading upon the secondary clock. Switch 118 includes an actuating cam 120 which is turned at the rate of one revolution every 12 hours. The cam includes a notched portion 121 which is oriented so that it is disposed in contact with switch finger 122 when the master clock reads from 5:00 to 5:15; thus switch 118 is closed from 5:00 to 5:15 every 12 hours. Switch 117 includes a cam disc 123 which rotates at a rate of one revolution per minute. Switch 117 is provided with a finger 124 which tracks upon the periphery of this disc and is open when it engages the recessed portion thereof. This recess portion 125 is disposed about the disc, so that the switch is open from zero seconds to 35 seconds of each minute and is closed from 35 seconds to 60 seconds of each minute.

In operation, suppose that the secondary clock reads 2:45 when the master control clock reads 5:00 o'clock. Switch 118 will close at 5:00 and switch 98 will be closed since switch finger 100 will not be in registry with recess 97. Switch 117 will also be closed so that a circuit will be completed to solenoid coil 77. Upon the closing of this solenoid, the driving disc will be shifted toward the driven gear 66 as explained above and will be effective to bring the second, minute and hour hands up to the 3:00′ 00″ position before the lug on gear 66 engages stop finger 73, and finger 34 engages stop arm 35. Then, at a master clock reading of 5:00′ 35″, switch 117 opens, deenergizing the solenoid, and disengaging stop arms 73 and 35 from lug 72 and finger 34 so that the minute, hour and second hands are again driven through the normal gear train.

However, at 5:01′ 00″ switch 117 is again closed, switch 118 and 98 remaining closed throughout the interval. When switch 117 closes, driving disc 67 is again shifted inwardly toward gear member 66, and the lug on the driving disc overtakes the cooperating lug on the gear so that the minute and hour hands are advanced to 4:00′ 00″ before the stop finger on gear 66 engages stop arm 73, and stop finger 34 on the second hand shaft engages the stop arm 35. At a master clock reading of 5:01′ 35″, switch 117 again opens to withdraw stop arms 73 and 35. For twenty-five seconds, the hour hand rotates at its normal rate through its normal gear drive. However, at 5:02′ 00″ switch 117 is again closed and the minute and hour hands of the secondary clock are corrected to 5:00′ 00″ as explained above. At the beginning of the next minute, switch 117 again closes but since the hour hand has been brought to 5:00 o'clock, switch finger 100 drops into recess 97 in hour switch cam 96 and that switch is opened to prevent further actuation of the solenoid coil 77. Consequently, no further corrective action can take place until switch 98 is again closed which occurs at 5:30. However, by 5:30, switch 118 is opened so that the hour hand correction means are deenergized for the next twelve hours. At 6:00 o'clock, the minute and second hands are brought into precise agreement with the master clock by the hourly correction means as explained before and the clock is thereafter driven in the usual manner.

If it should be desired to correct the clock manually, at some time other than the normal correction period, or to correct it for more than one hour at a correction period, this can be done by manipulating selector switch 114. For example, suppose that at 1:00 o'clock in the afternoon, the power is off for two hours so that when the power is again available at 3:00 p.m., the secondary clock reads 1:00 o'clock. By 6:00 o'clock at night, the clock will automatically be corrected to show the correct time. However, in many cases, it is extremely desirable to correct the secondary clock immediately. This can be accomplished by closing the manual switch so that a circuit is completed through the solenoid coil 77 through switch 117, selective switch 114, and hour hand correction switch 98. During the first interval that switch 117 is closed, the hour hand will be advanced one hour as explained above. The following minute switch 117 is again closed, and the hour hand will be advanced another full hour so that it will then read 3:00 o'clock, and the secondary clock will only be two minutes slow. Selector switch 114 can be then be returned to automatic position and the hour and second hands will be corrected the final two minutes at the next hourly correction period, or 4:00 p.m.

It will be apparent to those skilled in the art, that the present invention is susceptible in many modifications. For example, the signals from the master clock to the secondary clock need not be 110 volts, but can be carried by an auxiliary 24 volt or other low voltage line so that each of the secondary clocks can be energized from a two wire system, it only being necessary to install a light third wire for providing the correcting pulses.

Furthermore, in installations where the expense of an automatic correction system is not warranted, there is frequently the need to correct a relatively inaccessible clock. In such an installation, the master clock can be eliminated but the present secondary clock can be employed together with a simple manual switch which is effective to close solenoid coil 77 in the secondary clock.

The secondary clock can then be corrected by closing the manual switch until the hands of the secondary clock are brought into agreement with any available accurate clock.

An alternative form of the invention is illustrated in FIGS. 13–18. While it is feasible to employ this secondary clock with a master clock like that described above, the modified form of clock is also intended for use in installations where it is desirable to provide remote manual reset means for an inaccessible clock.

Figure 13:
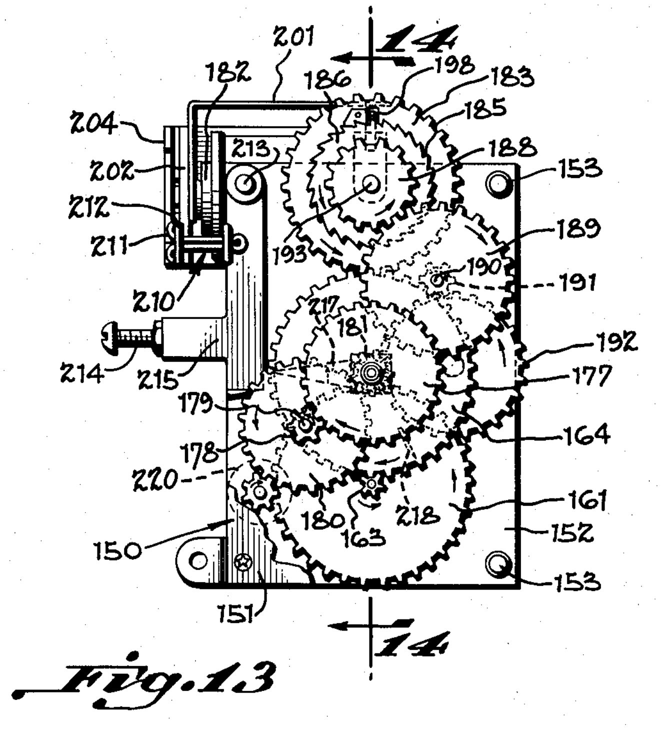
FIGURE 13 is a front elevational view of an alternative form of the invention.
Figure 14:
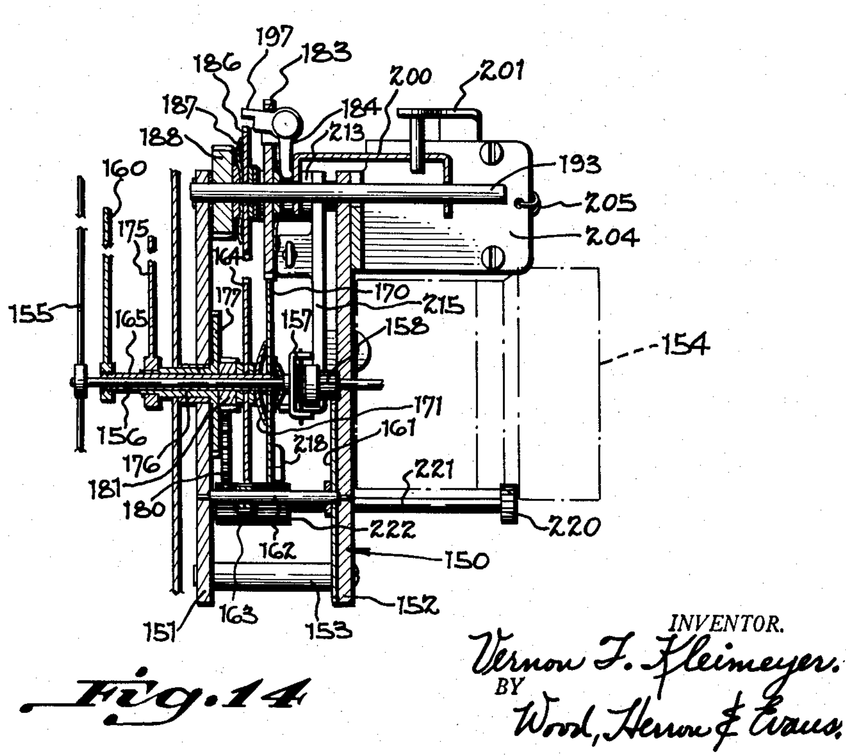
FIGURE 14 is a cross sectional view taken along line 14—14 of FIGURE 13.

Referring particularly to FIGS. 13 and 14 which illustrate the movement of a secondary clock, the elements are supported in a casing 150 formed by a front plate 151 and a rear plate 152, the plates being bolted together and spaced apart by posts 153. A synchronous motor 154 is mounted on plate 152 and directly drives a seconds hand 155 through shaft 156 and friction slip clutch 157 of the type illustrated in FIGS. 11 and 12.

A pinion 158, forming part of slip clutch 157, is directly driven by the motor and drives a minutes hand 160 through a gear train including gear 161 which drives shaft 162, and a pinion 163 fixed on shaft 162, the pinion in turn driving gear 164. The gear 164 is rotatable on a sleeve 165 surrounding seconds shaft 156. Minutes hand 160 is secured to the sleeve 165 and is driven thereby. A gear 170 is fixed on sleeve 165 and is coupled to gear 164 for driving engagement therewith by a bowed spring 171 which provides a friction engagement between the gear 170 and the gear 164.

An hour hand 175 is fastened to a sleeve 176 having a gear 177 at the end thereof inside casing 150. The gear 177 is driven by a pinion 178 (FIG. 13) fixed on a shaft 179. Gear 180 is also fixed on shaft 179 and meshes with a pinion 181 fixed on sleeve 165.

It should be observed that the friction engagement between gear 164 and gear 170 provided by spring 171 controls the drive to both the minutes hand 160 and hour hand 175. The frictional engagement between gears 164 and 170 permits gear 170 (and consequently the hours hand 175 and minutes hand 160) to be driven quite rapidly by synchronizing mechanism to be described below while gear 164 continues to be driven comparatively slowly by the synchronous motor.

The rapid advance of the hours and minutes hands driven by gear 170 is provided through a synchronizing mechanism under the control of a solenoid 182. The solenoid 182 will be operated through a circuit as shown in FIG. 1 in the same manner as solenoid 77 is operated as described above. Broadly the function of the mechanism operated by solenoid 182 is to bring a rapidly rotating member into driving engagement with gear 170. Since gear 170 normally rotates at one revolution per hour, the synchronizing mechanism which is designed to drive gear 170 at in excess of one revolution per minute will rapidly bring the hours and minutes hands to the proper position of synchronism with respect to a master clock or other correct timepiece. Another function of the solenoid operated mechanism is to interpose stops in engagement with corresponding detents on gear 170 and seconds clutch 157 to stop the synchronizing movement of the seconds hand, the minute hand and the hour hand, the hour hand being directly controlled by the minutes hand.

In addition to the solenoid 182, the synchronizing mechanism includes a gear 183 which meshes with gear 170. The gear 183 carries a pivotally mounted pawl 184 which, when operated by the electromagnet, will engage teeth 185 on a driven member 186 so that driven member 186 and gear 183 will rotate together. The driven member is connected through a resilient friction slip clutch 187 to a driving member 188. The friction clutch is designed to apply a greater coupling force between driven member 186 and driving member 188 than bowed spring 171 applies between gears 164 and 170. The driving member 188 is driven in excess of one revolution per minute by a gear 189 mounted on a shaft 190 which has fixed thereto a pinion 191. The pinion 191 is driven by the synchronous motor through gear 192.

Figures 15, 16, 17, 18:
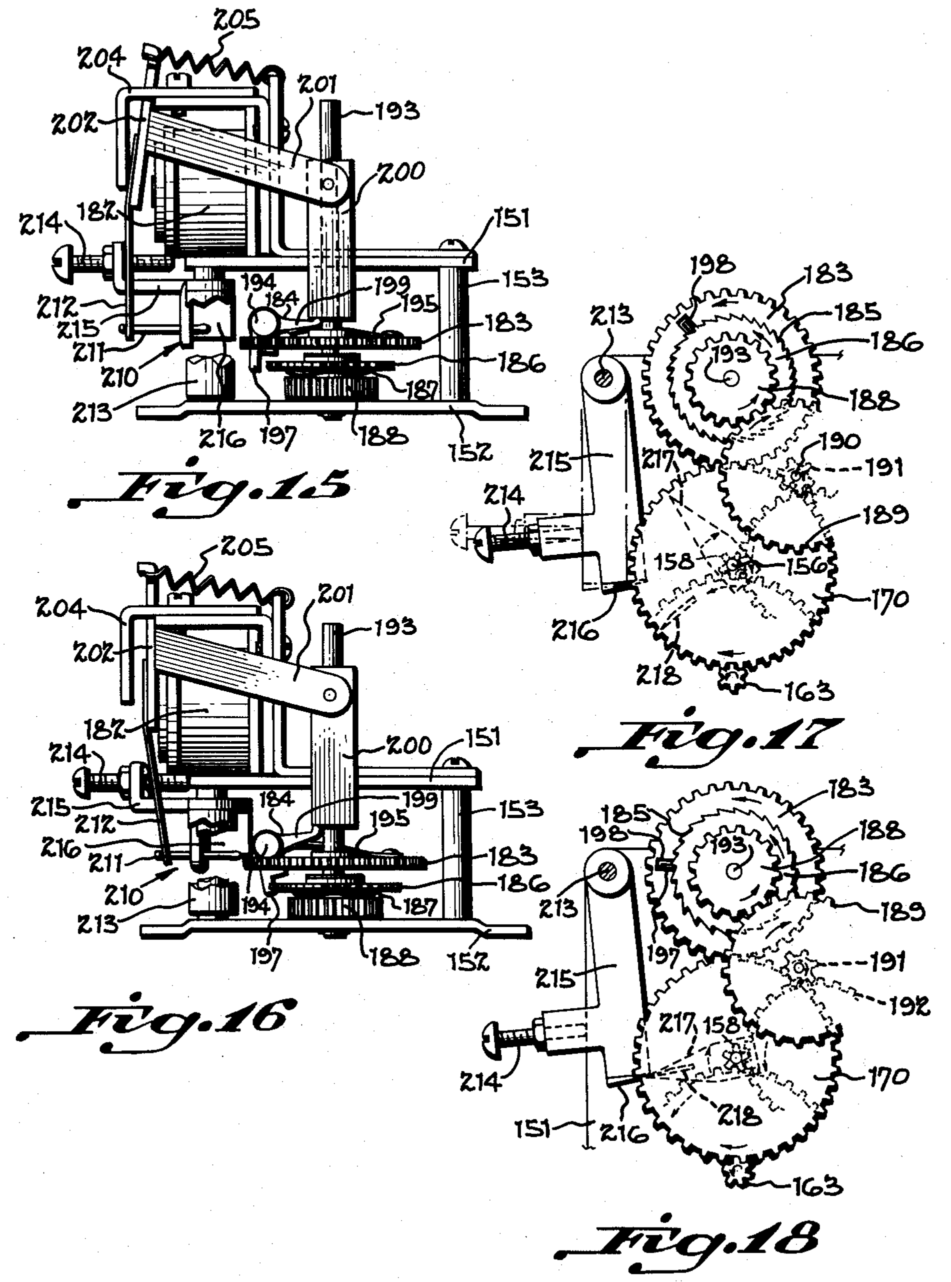
FIGURES 15 and 16 are a top plan view of the invention showing two positions of the synchronizing mechanism.
FIGURES 17 and 18 are fragmentary elevational views showing a sequence of operations during synchronization.

As best illustrated in FIGS. 15 and 16, the gear 183 is splined or otherwise fixed to a shaft 193. The pawl 184 is pivoted as at 194 to the gear 183 and is urged in a counterclockwise direction as illustrated in FIG. 15 by a leaf spring 195. The pawl is in the form of a bell crank lever having an arm 197 projecting through a slot 198 in the gear 183. The other arm 199 is engaged by a slidable member 200 loosely mounted on the shaft 193.

The slidable member 200 is reciprocated between an inoperative position shown in FIG. 15 and an operative position shown in FIG. 16 by an arm 201 fixed to an armature 202 of the solenoid 182. The armature 202 is pivotally mounted in a frame 204 and is urged by a spring 205 to the inoperative position of FIG. 15.

By comparing FIGS. 15 and 16 it can be seen that upon energization of the solenoid 182 the counterclockwise movement of the armature 202 will, through arm 201, hold the slidable member 200 away from the pawl 184, thereby permitting spring 195 to pivot the pawl counterclockwise from the position of FIG. 15 to the position of FIG. 16 in which the pawl arm 197 is in engagment with the teeth 185 of driven member 186. The driven member 186 will thereafter drive the gear 183 at a high rate of speed.

Also under the control of the solenoid 182 is a stop mechanism 210 which is connected through a cotter pin 211 to an arm 212 fixed to the electromagnet armature 202. The stop mechanism is pivotally mounted at 213 between the plates 151 and 152. An adjustment screw 214 is threaded in an arm 215 of the stop mechanism for setting the operative position of the stop mechanism through the engagement of the end of the screw 214 with the edge of the plate 151 as shown in FIG. 16. The adjustment screw, through its concentration of weight to the side of the pivotal mounting 213 tends to urge the stop mechanism, by gravity, in a counterclockwise direction as best illustrated in FIGS. 17 and 18.

The stop mechanism has a stop surface 216 which cooperates with a seconds detent arm 217 fixed to the seconds slip clutch 157. Through the connection of the seconds hand to the motor through the slip clutch, the stopping of the seconds detent will stop the seconds hand but will permit the motor to continue running.

The stop surface 216 is also engageable by a minutes detent arm 218 mounted on gear 170. Since gear 170 is fixed to the minutes hand 160 through sleeve 165, the blocking of the detent 218 and gear 170 will stop the minutes hand. The motor, being connected to the minutes hand through gear 164 and friction spring 171, will continue running even though the gear 170 has been stopped.

*Operation*

As was indicated above, the modified form of secondary clock shown in FIGURES 13–18, is primarily intended for use as an independent clock mounted in an inaccessible location where it is desirable to provide a remote reset control. For example, the clock may be mounted very high on a wall where it would be difficult for a workman to reach the clock and manually reset it. In such an installation, a manual switch is placed in a power supply line connected to solenoid 182. This switch can be located in any convenient location from which the clock face is visible. However, it is to be understood that the modified secondary clock can also be used with a master clock such as that described previously.

To best understand the operation of the secondary clock when used in conjunction with a master clock, let it be assumed that when the master clock has reached the time of 9:58′03″ and the secondary clock is at 9:25′10″. At this time the master clock will, through a suitable circuit, energize solenoid 182. The energization of solenoid 182 swings armature 202 from the position of FIG. 15 to the position of FIG. 16. Two distinct operations are thereby effected.

First, through arm 201 the slidable member 200 is pulled away from pawl 184 to permit the leaf spring 195 to pivot the pawl counterclockwise into engagement with toothed wheel 185. Toothed wheel 185 has been driven at in excess of two revolutions per minute by the gear 188 acting through the friction slip clutch 187. The action of pawl 184 in coupling gear 183 to the fixed driven toothed wheel or driven member 186 causes the gear 183 to be driven at in excess of one revolution per minute. The movement of gear 183 is transmitted to the minutes hand 160 through the gear 170 fixed to minutes hand sleeve 165. Because the coupling force of slip clutch 187 is greater than that of bowed spring 171, the gear 170 will be rotated in high speed while gear 164 will continue to rotate at slow speed by the synchronous motor.

The second operation effected by the energization of the solenoid 182 is the counterclockwise movement of arm 212 fixed to armature 202. By moving from the position of FIG. 15 to the position of FIG. 16, the stop mechanism is permitted to swing from the broken line position of FIG. 17 out of the way of detents 217 and 218, to the solid line position of FIG. 17 in which the stop surface 216 is brought into the path of the seconds detent 217 and the minutes detent 218.

At this point in the operation, the minutes detent carried by gear 170 is rotating at in excess of two revolutions per minute and is rapidly brought into engagement with the stop surface 216 as shown in FIG. 17. This blocked position of gear 170 is the 59′ position of minutes hand 160.

At the same time, the seconds hand is moving at its normal rate of speed until detent 217 engages the stop surface 216. At this position the seconds hand is in its 00″ position.

As described above in connection with FIG. 1, when the master clock reaches 9:59′00″ the circuit of FIG. 1 effects the de-energization of solenoid 182. Upon de-energization, the force of spring 205 acting upon armature 202 drives the pawl 184 out of coupling engagement with driven member 186 and simultaneously pulls stop mechanism with its stop surface 216 out of the path of the detents 217 and 218. The secondary clock thereafter continues to operate in exact synchronism with the master clock.

The secondary clock can be corrected in a similar manner when it is running up to 50 seconds ahead of the master clock. The correction is effected upon energization of the electromagnet at the 58th minute and 3rd second of the hour by swinging the stop mechanism in the path of minutes detent to hold up its progress at 59 minutes until the seconds hand detent 217 moves into engagement with the stop mechanism at 00″. The seconds and minutes hands will be held in this position until the master clock reaches its 59th minute whereupon the clocks continue to run in exact synchronization.

Manual correction of the hours and minutes hands of the secondary clock can be performed by a setting knob 220 (FIG. 14) at the rear of the clock. The seconds knob is connected through a shaft 221 and pinion 222 to gear 180. Rotation of gear 180 will directly set minutes hand 160 through rotation of pinion 181 fixed to minutes hand sleeve 165. The hour hand 175 will be set through the engagement of pinion 178 (which rotates with gear 180) with gear 177 fixed to the hour hand.

In a preferred installation of the modified form of secondary clock, however, the clock is not connected with the master clock. Rather, a separate manual switch, not shown, is placed in circuit connection with solenoid 182. Assume that the correct time is 10:42, this time being established by reference to any other accurate time piece. Further assume that the secondary clock reads 10:31. In order to correct the secondary clock, the workman closes the switch to energize solenoid 182. When this solenoid is energized, pawl 184 is brought into engagement with toothed wheel 185, as was explained above. The pawl is thereby effective to couple gear 184 to driven member 186. This advances minutes hand 160 at a rapid rate through the gear train described above. When the minutes hand 160 is advanced to the correct time, the switch is opened to de-energize solenoid 182 and disengage pawl 184 from toothed wheel 185. Thereafter, the clock hands are driven through their normal gear drive at normal time keeping rates, as explained above.

From the foregoing disclosure of the general principles of the present invention, and the above description of two embodiments, those skilled in the art will readily comprehend various modifications to which the invention is susceptible. For example, while the tooth wheel in the specific modification shown has sixty teeth, the wheel could have as few as two teeth or more than sixty teeth, if desired.

Having described my invention, I claim:

1. A secondary clock comprising a driving motor adapted to operate at a uniform predetermined rate, a rotatable seconds member, a rotatable minute member, first drive means for advancing each of said members at its normal time keeping rate, second drive means for advancing said minute member at a rate faster than its normal time keeping rate, said second drive means comprising slip clutch means, a driven member, means operatively connecting said driven member to said minute member for rotation therewith, a driving member, means operatively connecting the driving member and motor for continuous rotation therewith, means normally spacing said driven member and driving member in axially spaced relationship, and signal responsive means including a solenoid having a pivotally mounted magnetically responsive armature associated therewith, spring means urging said armature to a first position, said armature being shifted to a second position upon energization of said solenoid, coupling means mechanically interconnected to said armature for shifting said driving member into cooperative engagement with said driven member, abutment means in normally spaced relationship with said driven member, said signal responsive means being effective to shift said abutment means into the path of a portion of said driven member when said armature is in said second position whereby further rotation of said driven member is prevented, a stop finger mounted for rotation with said seconds member, an abutment member normally spaced from the path of said stop finger, said signal responsive means being effective to shift said abutment member into the path of said stop finger when said armature is in said second position, whereby further rotation of said seconds member is prevented, said signal responsive means being further effective to shift said abutment member from the path of said stop member upon return of the armature to its first position at the termination of said signal.

2. A secondary clock comprising a driving motor adapted to operate at a uniform predetermined rate, a rotatable seconds member, a rotatable minute member, first drive means for advancing each of said members at its normal time keeping rate, second drive means for advancing said minute member at a rate faster than its normal time keeping rate, said second drive means comprising slip clutch means, a rotatable driven member, means operatively connecting the driven member to said minute member for continuous rotation therewith, a driving member, means operatively connecting the driving member and motor for continuous rotation therewith, said driven member including a face, a projection extending from said face towards said driving member, an electric solenoid including an armature, spring means urging said armature to a first position, said armature being shifted to a second position upon energization of said solenoid, means operatively connecting said driving member and said solenoid armature whereby when said solenoid is energized and said armature is shifted to said second position said driving member is shifted axially toward said driven member, a finger carried by said driving member and adapted for engagement with said projection on said driven member when the driving member is shifted axially by energization of said solenoid, said driving member being shifted axially away from said driven member to disengage said finger and projection when said solenoid is deenergized and said armature is returned to its first position.

3. A secondary clock comprising a driving motor adapted to operate at a uniform predetermined rate, a rotatable seconds member, a rotatable minute member, first drive means for advancing each of said members at its normal time keeping rate, second drive means for advancing said minute member at a rate faster than its normal time keeping rate, said second drive means comprising slip clutch means, a rotatable driven member, means operatively connecting the driven member to said minute member for continuous rotation therewith, a driving member, means operatively connecting the driving member and motor for continuous rotation therewith, said driven member including a face, a projection extending from said face towards said driving member and an outwardly extending lug, an electric solenoid including an armature, spring means normally urging said armature to a first position, said armature being shifted to a second position upon energization of said solenoid, means operatively connecting said driving member and said solenoid armature whereby when said solenoid is energized and said armature is shifted to said second position said driving member is shifted axially toward said driven member, a finger carried by said driving member and adapted for engagement with said projection on said driven member when the driving member is shifted axially by energization of said solenoid, an abutment member in normally spaced relationship with said driven member, means interconnecting said abutment member and said solenoid armature, whereby said abutment member is shifted into the path of said lug carried by the driven member when the solenoid is energized and said armature is shifted to its second position, so that said abutment member is effective to prevent further rotation of said driven member, said driving member being shifted axially away from said driven member, and said abutment member being shifted from the path of said lug when said solenoid is deenergized and said armature is returned to said first position.

4. A secondary clock comprising a driving motor adapted to operate at a uniform predetermined rate, a rotatable seconds member, a rotatable minute member, first drive means for advancing each of said members at its normal time keeping rate, second drive means for advancing said minute member at a rate faster than its normal time keeping rate, said second drive means comprising slip clutch means, a rotatable driven member, means operatively connecting the driven member to said minute member for continuous rotation therewith, a driving member, means operatively connecting the driving member and motor for continuous rotation therewith, said driven member including a face, a projection extending from said face towards said driving member and an outwardly extending lug, an electric solenoid including an armature, spring means urging said armature to a first position, said armature being shifted to a second position upon energization of said solenoid, means operatively connecting said driving member and said solenoid armature whereby when said solenoid is energized and said armature is shifted to its second position said driving member is shifted axially toward said driven member, a finger carried by said driving member and adapted for engagement with said projection on said driven member when the driving member is shifted axially by energization of said solenoid, an abutment member in normally spaced relationship with said driven member, means interconnecting said abutment member and said solenoid armature, whereby said abutment member is shifted into the path of said lug carried by the driven member when the solenoid is energized and the armature is shifted to its second position so that the abutment member is effective to prevent further rotation of said driven member, a stop finger mounted for rotation with said seconds member, a second abutment member normally spaced from the path of said stop finger, means interconnecting said second abutment member and said solenoid armature for shifting said abutment member into the path of said stop finger when said solenoid is energized and the armature is shifted to its second position, said second abutment member being effective to prevent further rotation of said seconds member, said driving member being shifted away from said driven member, said first named abutment member being shifted from the path of said lug, and said second abutment member being shifted from the path of said stop finger when said solenoid is deenergized and said armature is returned to its first position.

5. A secondary clock comprising a driving motor adapted to operate at a uniform predetermined rate, a rotatable seconds member, a rotatable minute member, a blocking detent operatively connected to each of said members, first drive means for advancing each of said members through respective slip clutches at its normal time keeping rate, second drive means for advancing said minute member at a rate faster than its normal time keeping rate, said second drive means comprising slip clutch means, a driven member, means operatively connecting said driven member to said minutes member for rotation therewith, a driving member, means operatively connecting the driving member and motor for continuous rotation therewith, means rotatably supporting said driven member and driving member in axially spaced relationship, a stop mechanism having stop surfaces movable into the paths of said detents, signal responsive means including a solenoid having a pivotally mounted magnetically responsive armature associated therewith, spring means urging said armature to a first position, said armature being shifted to a second position upon energization of said solenoid, coupling means mechanically interconnected to said armature for establishing cooperative driving engagement between said driving member and said driven member and for effecting movement of said stop surfaces into the paths of said detents during the period of energization of said solenoid when said armature is in said second position, said coupling means being effective to disconnect said driving member and said driven member when said solenoid armature is returned to said first position, said coupling means beng further effectve to move said stop surface out of the path of said detent when said armature is returned to said first position.

6. A secondary clock comprising a driving motor adapted to operate at a uniform predetermined rate, a rotatable seconds member, a rotatable minute member, first drive means for advancing each of said members at its normal time keeping rate, second drive means for advancing said minute member at a rate faster than its normal time keeping rate, said second drive means comprising slip clutch means, a driven member, means operatively connecting said driven member to said minute member for rotation therewith, a driving member, means operatively connecting the driving member and motor for continuous rotation therewith, means rotatably supporting said driven member and driving member in axially spaced relationship, and signal responsive means including a solenoid having a pivotally mounted magnetically responsive armature associated therewith, spring means urging said armature to a first position, said armature being shifted to a second position upon energization of said solenoid, coupling means mechanically interconnected to said armature for establishing cooperative driving engagement between said driving member and said driven member during the period of energization of said solenoid when said armature is shifted to said second position, a projection rotatable in synchronism with said minute hand, abutment means in normally spaced relationship from said projection, said abutment means being mechanically interconnected with said solenoid, said abutment means being shifted into the path of said projection when said solenoid is energized and said armature is shifted to said second position, said abutment means being shifted from the path of said projection when said solenoid is deenergized and said armature is returned to its first position.

7. A secondary clock comprising a driving motor adapted to operate at a uniform predetermined rate, a rotatable seconds member, a rotatable minute member, first drive means for advancing each of said members at its normal time keeping rate, second drive means for advancing said minute member at a rate faster than its normal time keeping rate, said second drive means comprising slip clutch means, a driven member, means operatively connecting said driven member to said minute member for rotation therewith, a driving member, means operatively connecting the driving member and motor for continuous rotation therewith, means rotatably supporting said driven member and driving member in axially spaced relationship, and signal responsive means including a solenoid having a pivotally mounted magnetically responsive armature associated therewith, spring means urging said armature to a first position, said armature being shifted to a second position upon energization of said solenoid, coupling means mechanically interconnected to said armature for establishing cooperative driving engagement between said driving member and said driven member during the period of energization of said solenoid when said armature is shifted to its second position, a projection rotatable in synchronism with said minute hand, abutment means in normally spaced relationship from said projection, said abutment means being mechanically interconnected with said solenoid, said abutment means being shifted into the path of said projection when said solenoid is energized, and said armature is shifted to its second position, said abutment means being shifted from the path of said projection when said solenoid is deenergized and said armature is returned to its first position, a second projection rotatable with said second hand, and a second abutment mechanically interconnected with said solenoid, said second abutment being shifted into the path of said second projection when said solenoid is energized and said armature is shifted to its second position, said second abutment being shifted from the path of said second projection when said solenoid is deenergized and said armature is returned to its first position.

8. A secondary clock comprising a driving motor adapted to operate at a uniform predetermined rate, a rotatable seconds member, a rotatable minute member, a blocking detent operatively connected to each said members, first drive means for advancing each of said members through respective slip clutches at its normal time keeping rate, second drive means for advancing said minute member at a rate faster than its normal time keeping rate, said second drive means comprising slip clutch means, a driven member, means operatively connecting said driven member to said minute member for rotation therewith, a driving member, means operatively connecting the driving member and motor for continuous rotation therewith, means rotatably supporting said driven member and driving member in axially spaced relationship, a stop mechanism having a single stop surface movable into the paths of said detents, signal responsive means including a solenoid having a pivotally mounted magnetically responsive armature associated therewith, spring means urging said armature to a first position, said armature being shifted to a second position upon energization of said solenoid, coupling means mechanically interconnected to said armature for establishing cooperative driving engagement between said driving member and said driven member and for effecting movement of said stop surface into the paths of said detents during the period of energization of said solenoid and when said armature is in said second position, said coupling means being effective to disconnect said driving member and said driven member when said solenoid armature is returned to said first position, said coupling means being further effective to move said stop surface out of the path of said detent when said armature is returned to said first position.

9. A secondary clock comprising a driving motor adapted to operate at a uniform predetermined rate, a rotatable minute member, first drive means for advancing said minute member through a first friction slip clutch at its normal time keeping rate, second drive means for advancing said minute member at a rate faster than its normal time keeping rate, said second drive means comprising a driven member mounted on a shaft, means operatively connecting said driven member to said minutes member for rotation therewith, a high speed driving member mounted on said shaft, an intermediate member mounted on said shaft, means operatively connecting the driving member and motor for continuous rotation of said driving member at a speed normally greater than said driven member, a second slip clutch connecting said driving member to said intermediate member, said second slip clutch applying a greater connecting force than said first slip clutch, signal responsive means including a solenoid having a pivotally mounted magnetically responsive armature associated therewith, spring means urging said armature to a first position, said armature being shifted to a second position upon energization of said solenoid, coupling means mechanically interconnected to said armature for establishing cooperative driving engagement between said intermediate member and said driven member during a preselected period when said armature is in said second position, said coupling means being effective to disconnect said driving member and said driven member when said solenoid armature is returned to said first position.

10. A secondary clock comprising a driving motor adapted to operate at a uniform predetermined rate, a rotatable minute member, first drive means for advancing said minute member at its normal time keeping rate, second drive means for advancing said minute member at a rate faster than its normal time keeping rate, said second drive means comprising slip clutch means, a driven member mounted on a shaft, means operatively connecting said driven member to said minute member for rotation therewith, a high speed driving member mounted on said shaft, an intermediate member mounted on said shaft, means operatively connecting the driving member and motor for continuous rotation of said driving member at a speed normally greater than said driven member, a slip clutch connecting said driving member to said intermediate member, signal responsive means including a solenoid having a pivotally mounted magnetically responsive armature associated therewith, spring means urging said armature to a first position, said armature being shifted to a second position upon energization of said solenoid, coupling means mechanically interconnected to said armature for establishing cooperative driving engagement between said intermediate member and said driven member during a preselected period when said armature is in said second position, said coupling means being effective to disconnect said driving member and said driven member when said solenoid armature is returned to said first position.

11. A secondary clock comprising a driving motor adapted to operate at a uniform predetermined rate, a rotatable minute member, first drive means for advancing said minute member at its normal time keeping rate, second drive means for advancing said minute member at a rate faster than its normal time keeping rate, said second drive means comprising a driven member mounted on a shaft, means operatively connecting said driven member to said minute member for rotation therewith, a high speed driving member mounted on said shaft, an intermediate member mounted on said shaft, means operatively connecting the driving member and motor for continuous rotation of said driving member at a speed normally greater than said driven member, a slip clutch connecting said driving member to said intermediate member, a pawl pivotally mounted on said driven member for coupling engagement with said intermediate member, signal responsive means including a solenoid having a pivotally mounted magnetically responsive armature associated therewith, spring means urging said armature to a first position, said armature being shifted to a second position upon energization of said solenoid, coupling means mechanically interconnected to said armature for pivoting said pawl into driving engagement with said intermediate member during a preselected period of energization of said solenoid and when said armature is in said second position, said coupling means being effective to disconnect said driving member and said driven member when said solenoid armature is returned to said first position.

12. A secondary clock comprising a driving motor adapted to operate at a uniform predetermined rate, a rotatable minute member, first drive means for advancing said minute member at its normal time keeping rate, second drive means for advancing said minute member at a rate faster than its normal time keeping rate, said second drive means comprising a driven member mounted on a shaft, means operatively connecting said driven member to said minute member for rotation therewith, a high speed driving member mounted on said shaft, an intermediate member mounted on said shaft and having a plurality of teeth uniformly spaced around the periphery thereof, means operatively connecting the driving member and motor for continuous rotation of said driving member at a speed normally greater than said driven member, a slip clutch connecting said driving member to said intermediate member, a pawl pivotally mounted on said driven member for coupling engagement with the teeth of said intermediate member, signal responsive means including a solenoid having a pivotally mounted magnetically responsive armature associated therewith, spring means urging said armature to a first position, said armature being shifted to a second position upon energization of said solenoid, coupling means mechanically interconnected to said armature for pivoting said pawl into driving engagement with said intermediate member during a preselected period of energization of said solenoid and when said armature is in said second position, said coupling means being effective to disconnect said driving member and said driven member when said solenoid armature is returned to said first position.

13. A secondary clock comprising a driving motor adapted to operate at a uniform predetermined rate, a rotatable minute member, first drive means for advancing said minute member at its normal time keeping rate, second drive means for advancing said minute member at a rate faster than its normal time keeping rate, said second drive means comprising a driven member mounted on a shaft, means operatively connecting said driven member to said minute member for rotation therewith, a high speed driving member mounted on said shaft, an intermediate member mounted on said shaft and having two diametrically opposed teeth, means operatively connecting the driving member and motor for continuous rotation of said driving member at a speed normally greater than said driven member, a slip clutch connecting said driving member to said intermediate member, a pawl pivotally mounted on said driven member for coupling engagement with the teeth of said intermediate member, signal responsive means including a solenoid having a pivotally mounted magnetically responsive armature associated therewith, spring means urging said armature to a first position, said armature being shifted to a second position upon energization of said solenoid, coupling means mechanically interconnected to said armature for pivoting said pawl into driving engagement with said intermediate member during a preselected period of energization of said solenoid and when said armature is in said second position, said coupling means being effective to disconnect said driving member and said driven member when said solenoid armature is returned to said first position.

References Cited in the file of this patent

UNITED STATES PATENTS

| | | |
|---|---|---|
| 1,960,508 | Poole | May 29, 1934 |
| 2,198,632 | Mullan | Apr. 30, 1940 |
| 2,332,278 | Stone | Oct. 19, 1943 |
| 2,447,798 | Deane | Aug. 24, 1948 |
| 2,652,683 | Stern | Sept. 22, 1952 |
| 2,700,271 | Sprecker | Jan. 25, 1955 |